(12) United States Patent
Rossmann

(10) Patent No.: US 11,176,527 B2
(45) Date of Patent: Nov. 16, 2021

(54) CROSS-NETWORK ACTION APPROVAL

(71) Applicant: NCR Corporation, Duluth, GA (US)

(72) Inventor: Wolf Rossmann, Forfar (GB)

(73) Assignee: NCR Corporation, Atlanta, GA (US)

(*) Notice: Subject to any disclaimer, the term of this patent is extended or adjusted under 35 U.S.C. 154(b) by 854 days.

(21) Appl. No.: 14/698,293

(22) Filed: Apr. 28, 2015

(65) Prior Publication Data

US 2016/0321626 A1    Nov. 3, 2016

(51) Int. Cl.
| | |
|---|---|
| *G06Q 20/10* | (2012.01) |
| *G06Q 20/02* | (2012.01) |
| *G06Q 40/02* | (2012.01) |
| *G06Q 20/42* | (2012.01) |
| *H04L 9/32* | (2006.01) |
| *G06F 21/33* | (2013.01) |

(52) U.S. Cl.
CPC ........ *G06Q 20/1085* (2013.01); *G06Q 20/027* (2013.01); *G06Q 20/425* (2013.01); *G06Q 40/02* (2013.01); *H04L 9/32* (2013.01); *G06F 21/33* (2013.01)

(58) Field of Classification Search
CPC ............. G06Q 20/1085; G06Q 20/027; G06Q 20/425; G06Q 20/38215; G06Q 40/02; H04L 9/32; G06F 21/33
See application file for complete search history.

(56) References Cited

U.S. PATENT DOCUMENTS

| | | | | |
|---|---|---|---|---|
| 6,327,578 | B1 * | 12/2001 | Linehan ................. | G06Q 20/04 705/65 |
| 7,152,045 | B2 * | 12/2006 | Hoffman ................. | G06F 21/32 705/43 |
| 7,350,230 | B2 * | 3/2008 | Forrest .................... | G06Q 20/32 705/67 |
| 7,980,462 | B1 * | 7/2011 | Graef ...................... | G06Q 30/02 235/379 |
| 9,386,003 | B2 * | 7/2016 | Kumar .................... | G06Q 20/20 |
| 9,836,733 | B2 * | 12/2017 | Course ................... | G06Q 20/209 |
| 10,282,710 | B2 * | 5/2019 | Wong ..................... | G06Q 20/326 |
| 2003/0182230 | A1 * | 9/2003 | Pessin .................... | G06Q 40/025 705/39 |

(Continued)

FOREIGN PATENT DOCUMENTS

| | | | | |
|---|---|---|---|---|
| EP | 2556624 | B1 * | 2/2020 | ............ H04L 63/18 |
| KR | 20090114585 | A | * | 11/2009 |

OTHER PUBLICATIONS

"SEPIA: Secure-PIN-Authentication-as-a-Service for ATM using Mobile and Wearable Devices"; Rasib Khan, Ragib Hasan, and Jinfang Xu; 2015 3rd IEEE International Conference on Mobile Cloud Computing, Services, and Engineering (Year: 2015).*

(Continued)

*Primary Examiner* — Steven S Kim
*Assistant Examiner* — Edgar R Martinez-Hernandez
(74) *Attorney, Agent, or Firm* — Schwegman, Lundberg & Woessner

(57) ABSTRACT

Automated assistance for an action is requested over a self-service network from a Self-Service Terminal (SST). A first approval is received as a token over the self-service network. The action and the token are sent over a secure network from the SST for a second approval. When the second approval is received over the secure network, the action is processed on the SST.

12 Claims, 4 Drawing Sheets

(56) References Cited

U.S. PATENT DOCUMENTS

| | | | | |
|---|---|---|---|---|
| 2006/0089893 | A1* | 4/2006 | Joseph | G06Q 20/3672 705/35 |
| 2010/0088237 | A1* | 4/2010 | Wankmueller | G06Q 30/0601 705/75 |
| 2010/0250338 | A1* | 9/2010 | Banerjee | G06Q 40/12 705/16 |
| 2011/0016047 | A1* | 1/2011 | Wu | G06Q 20/1085 705/43 |
| 2011/0173122 | A1* | 7/2011 | Singhal | G06Q 20/3223 705/44 |
| 2011/0238573 | A1* | 9/2011 | Varadarajan | G06Q 20/1085 705/43 |
| 2012/0030047 | A1* | 2/2012 | Fuentes | G06Q 20/04 705/26.1 |
| 2012/0039469 | A1* | 2/2012 | Mueller | G06Q 20/12 380/252 |
| 2012/0160912 | A1* | 6/2012 | Laracey | G06Q 20/1085 235/379 |
| 2013/0117822 | A1* | 5/2013 | Soulez | G06Q 20/04 726/4 |
| 2013/0124422 | A1* | 5/2013 | Hubert | G06Q 20/3827 705/71 |
| 2014/0143137 | A1* | 5/2014 | Carlson | G06Q 20/18 705/39 |
| 2014/0188586 | A1* | 7/2014 | Carpenter | G06Q 30/0222 705/14.23 |
| 2014/0372308 | A1* | 12/2014 | Sheets | G06Q 20/40 705/44 |
| 2015/0032627 | A1* | 1/2015 | Dill | G06Q 20/40 705/44 |
| 2015/0178730 | A1* | 6/2015 | Gleeson | G06Q 20/027 705/72 |
| 2015/0188915 | A1* | 7/2015 | Li | H04L 63/126 705/44 |
| 2015/0227932 | A1* | 8/2015 | Huxham | G06Q 20/027 705/76 |
| 2016/0078430 | A1* | 3/2016 | Douglas | G06Q 30/0185 705/43 |
| 2016/0104140 | A1* | 4/2016 | Harrow | G06Q 20/18 705/42 |
| 2017/0262844 | A1* | 9/2017 | Laracey | G06Q 20/3821 |

OTHER PUBLICATIONS

"Secure Protocol for Financial Transactions Using Smartphones—SPFT Formally Proved by AVISPA"; Shizra Sultan, Abdul Ghafoor Abbasi, Awais Shibli and Ali Nasir; August (Year: 2014).*

"Enhancing Communication Adaptability Between Payment Card Processing Networks"; Adnan Noor Mian, Abdul Hameed, Muhammad Umar Khayyam, Farooq Ahmed, and Roberto Beraldi; IEEE Communications Magazine—Communications Standards Supplement • Mar. 2015 (Year: 2015).*

For EP-2556624-B1: English translation of WO 2011/123940 (Oct. 13, 2011 Gazette 2011/41); Boysen, Andre Michel, Ronda, Troy Jacob, Roberge, Pierre Antoine, Engel, Patrick Hans, Wolfond, Gregory Howard. (Year: 2011).*

For KR-20090114585-A: translation of application KR 20080040290A; Choi, Soo-jin. (Year: 2008).*

\* cited by examiner

CROSS-NETWORK ACTION APPROVAL

BACKGROUND

Automated Teller Machines (ATMs) provide secure financial transactions for their financial customers. During a transaction, a customer swipes a bank card and selects a transaction type. Encrypted customer-details (obtained from a magnetic strip on the card) and the transaction type are routed through a secure financial network. A secure network switch determines a financial institution for the customer's transaction and routes the encrypted details and transaction type to the financial institution for processing and for a returned indication of an approval or a denial. The indication from the financial institution is routed back through the switch to the ATM. Assuming approval is obtained at the ATM and the transaction type is for a withdrawal of currency, the ATM sends an authorization and dispense amount to a dispenser (integrated into the ATM) and debits a ledger to reflect the currency being dispensed. The dispenser dispenses the currency to the customer.

When a customer needs assistance (either before the transaction was sent through the secure financial network or when a denial is received back at the ATM through the secure financial network), some bank branches offer automated interactive teller assistance at the ATM. A teller (either (locally) within the bank branch or external (remotely) from the bank branch) reviews the transaction and, in some cases, overrides any denial and authorizes the transaction for processing at the ATM.

The teller assistance and any transaction authorization occur over different networks. That is, the secure financial network is bypassed and the local network within the bank branch and a separate network from the bank branch to the financial institution's backend system are used to provide the transaction authorization back to the ATM to authorize the transaction.

The secure financial network is separate and independent network such that changing communications within the secure financial network is believed to be too burdensome and obtaining an independent connection to the secure financial network is all but impossible given government regulations and the variety of different financial institutions and ATMs supported by the secure financial network. Moreover, processing the transaction from the bank branch with the back-end financial server and back to the ATM requires changes to software within the bank branch for each variation that may occur and requires continual maintenance of such software changes.

As a result, there is a need to provide transaction authorization processing (for authorization that originates from a customer assistance network) back through a secure financial network.

SUMMARY

In various embodiments, methods and an Automated Teller Machine (ATM) for cross-network action approval are presented.

According to an embodiment, a method for cross-network action approval is provided. Specifically, in an embodiment, a request for assistance in approving an action for processing is forwarded over a first network. A first approval for processing the action is received over the first network. Next, a token representing the first approval is generated. Then, the token is caused to be sent over a second network for a second approval for processing.

DETAILED DESCRIPTION

Figure 1:
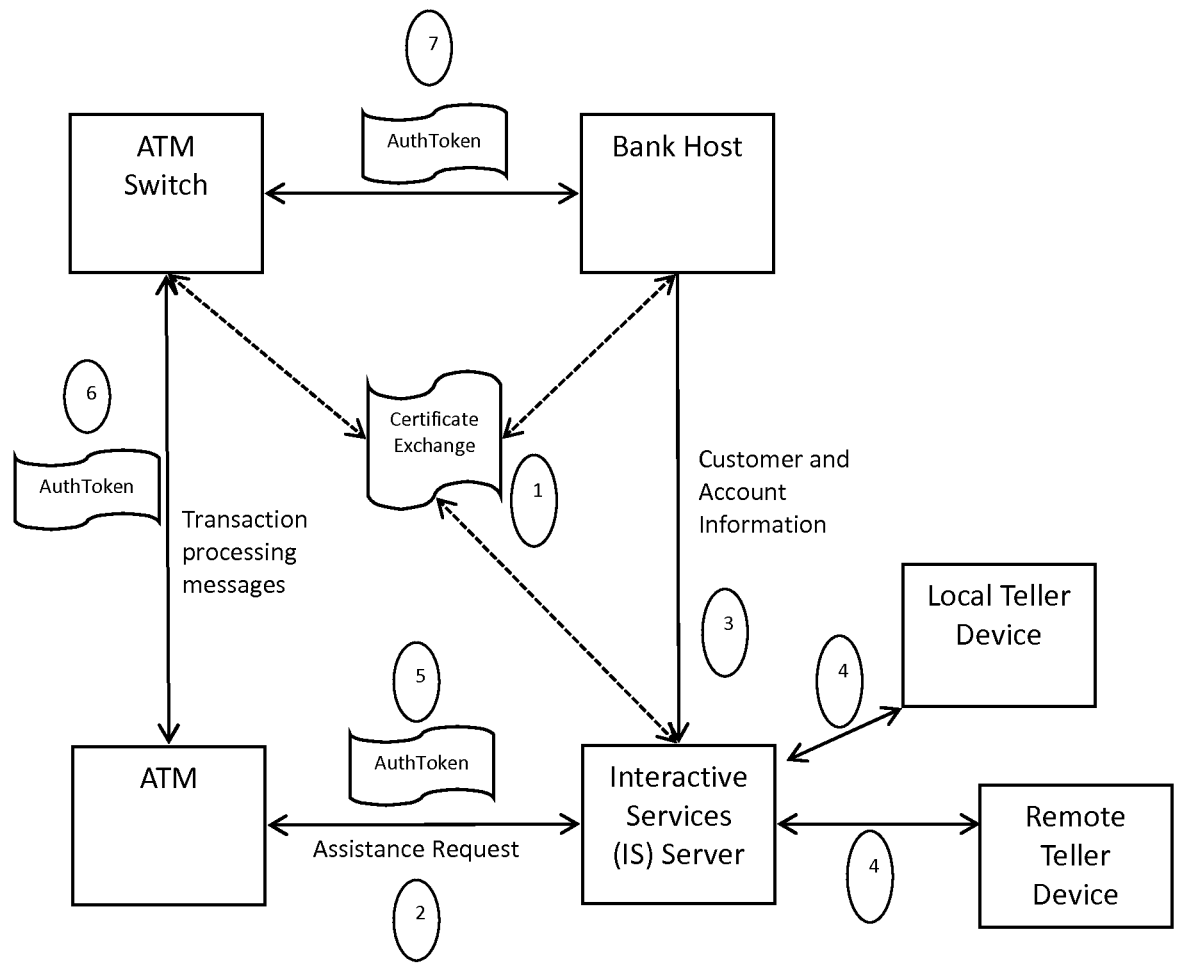
FIG. 1 is a diagram of a bank system with cross-network action approval capabilities, according to an example embodiment.

FIG. 1 is a diagram of a bank system with cross-network action approval capabilities, according to an example embodiment. The various components are illustrated and the arrangement of the components is presented for purposes of illustration only. It is to be noted that other arrangements with more or less components are possible without departing from the teachings of cross-network action approval presented herein and below.

The techniques and methods presented herein and below for cross-network action approval can be implemented in whole or in part in one, all, or some combination of the components shown with the FIG. 1. The techniques and methods are programmed as executable instructions in memory and/or non-transitory computer-readable storage media and processed on one or more processors associated with the various components.

The banking system includes an ATM, an Interactive Services (IS) server, a local teller operating a local teller device and a remote teller operating a remote teller device, an ATM switch, and a bank host.

The ATM processes transactions for customers through an ATM network (the double arrow connection labeled "Transaction processing messages" and located between the ATM and the ATM switch in the FIG. 1). This is done using a standard protocol for financial transactions through the ATM switch.

Separately, the ATM also interacts with the IS server through a local bank branch network or wide-area bank branch network (the double arrow connection labeled "Assistance Request" between the ATM and the IS server). This is done using a different protocol from that which the ATM uses to communicate over the ATM network. The local bank branch network can be used to alert tellers (through local and remote teller devices) to assistance requests needed by a customer operating the ATM before or during an ATM transaction.

When the system (shown in the FIG. 1) is initially installed, a trust chain is established by exchanging certificates or a similar mechanism between the IS server and the bank host and/or ATM switch (depending upon whether the bank host or the ATM switch provides transaction authorization for the ATM during a transaction. Through this mechanism, public keys are exchanged at for allowing secure and authenticated exchange of data between the ATM switch, the IS server, and the Bank host. It is noted that dotted lines depicting exchange of certificates (at (1)) amongst the entities reflects logical exchanges and not physical exchanges, since communication from the IS server to the ATM switch physically passes through the bank host and there is no direct network connection between the IS server and the ATM switch.

When a customer performs a transaction at the ATM that requires a teller (local or remote) authorization (defined by business logic processed on the ATM or by a denial of the request from the ATM switch), an assistance request, which includes the customer's identity (account number, etc.) and transaction details (transaction number, transaction type, any amount associated with the transaction, ATM identifier, etc.), is sent to the IS server at (2).

A local teller (within the bank branch and using the Local-Area Network (LAN) of the bank branch) or a remote teller (external to the bank branch and contacted over a Wide Area Network (WAN) from the bank-branch) is alerted to the assistance request at (3) and can use a network connection to access the bank host (bank back-end system) to retrieve additional customer details and customer account information and review the assistance request at (4) in view of the transaction details for the transaction.

When the bank employee (local or remote teller) approves the request, a token is generated. The token includes: details that identifies the bank employee (local or remote teller) and an indication of the teller's review and approval of the request. The token is then digitally signed. In an embodiment, the token also includes a personal certificate that is unique to the teller. The token is then sent back to the ATM with the indication that the transaction can proceed at the ATM at (5).

The ATM now requests authorization of the transaction at (6) using the standard secure network ATM protocol over the secure financial network and includes with the request for authorization the signed token received from the IS server.

In cases where the ATM switch provides transaction authorization when processing in stand-in mode, the ATM switch validates the token (using the certificates for the entities exchanged at (1) during initialization of the system) and authorizes the transaction for processing at the ATM based on the validity of the token and any associated business rules that need evaluated (rather than normal ATM business rules). An authorization code is sent from the ATM switch to the ATM and the ATM completes the transaction.

In cases where the ATM host provides transaction authorization (ATM switch operating in on-line mode), the ATM switch passes the token to the ATM host at (7). The ATM host validates the token (using the certificates for the entities exchanged at (1) during initialization of the system) and authorizes the transaction for processing at the ATM based on the validity of the token and any associated business rules that need evaluated (rather than normal ATM business rules). An authorization is sent from the ATM host to the ATM switch where it is forwarded back to the ATM and the ATM completes the transaction.

In an embodiment, the business rules evaluated can be defined to extend withdrawal limits, approve check deposits, approve check cashing, and similar transactions because the authorizing entity (ATM switch in stand-in mode or the ATM host when the ATM switch is in on-line mode) has the additional authentication details from the teller (local or remote), who reviewed and approved the transaction at (4) using the local teller device or the remote teller device.

The processing associated with the system of the FIG. 1 demonstrates how a teller can provider override assistance to an ATM customer's transaction through a self-service network and have the transaction approved through a secure financial network using normal secure financial network protocol communications. This extends the range of services that can be provided over the self-service network without new integrations for transaction processing between a local bank branches IS server and a bank's back-end server (bank host).

The transaction is reviewed and approved over a LAN bank branch network (self-service network) and/or WAN bank branch network (self-service network with remotely accessible bank staff in a call center) but approved for processing at the ATM over the secure financial network to achieve cross-network (different networks (self-service network and secure financial network)) action (transaction) approval. In this manner, cross-network action approval processing is achieved.

In an embodiment, the token is provided in one or more unused or extended fields of the secure financial network protocol. The ATM application is enhanced to send the transaction to the ATM switch with the token in the one or more unused or extended fields. When the ATM switch is in stand-in mode, a switch application is enhanced to detect the presence of the token in the unused or extended fields and validate the token using the certificates exchanged during initialization. When the ATM switch is in on-line mode, the ATM switch forwards the token to the ATM host for validation where an ATM host application is enhanced to detect the presence of the token in the unused or extended fields and validate the token using the certificates exchanged during initialization.

As a result, the secure financial protocol and processing flow between the ATM and the ATM switch and the ATM host and the ATM switch need not change; other than an addition of the token (discussed herein) within an unused or extended field provided with the secure financial protocol and modifications to receiving applications on the ATM switch (in stand-in mode) and ATM host (when the ATM switch is in on-line mode) to recognize and process the token from the unused or extended field of the secure financial protocol.

These and other embodiments will now be discussed with reference to the FIGS. 2-4.

Figure 2:
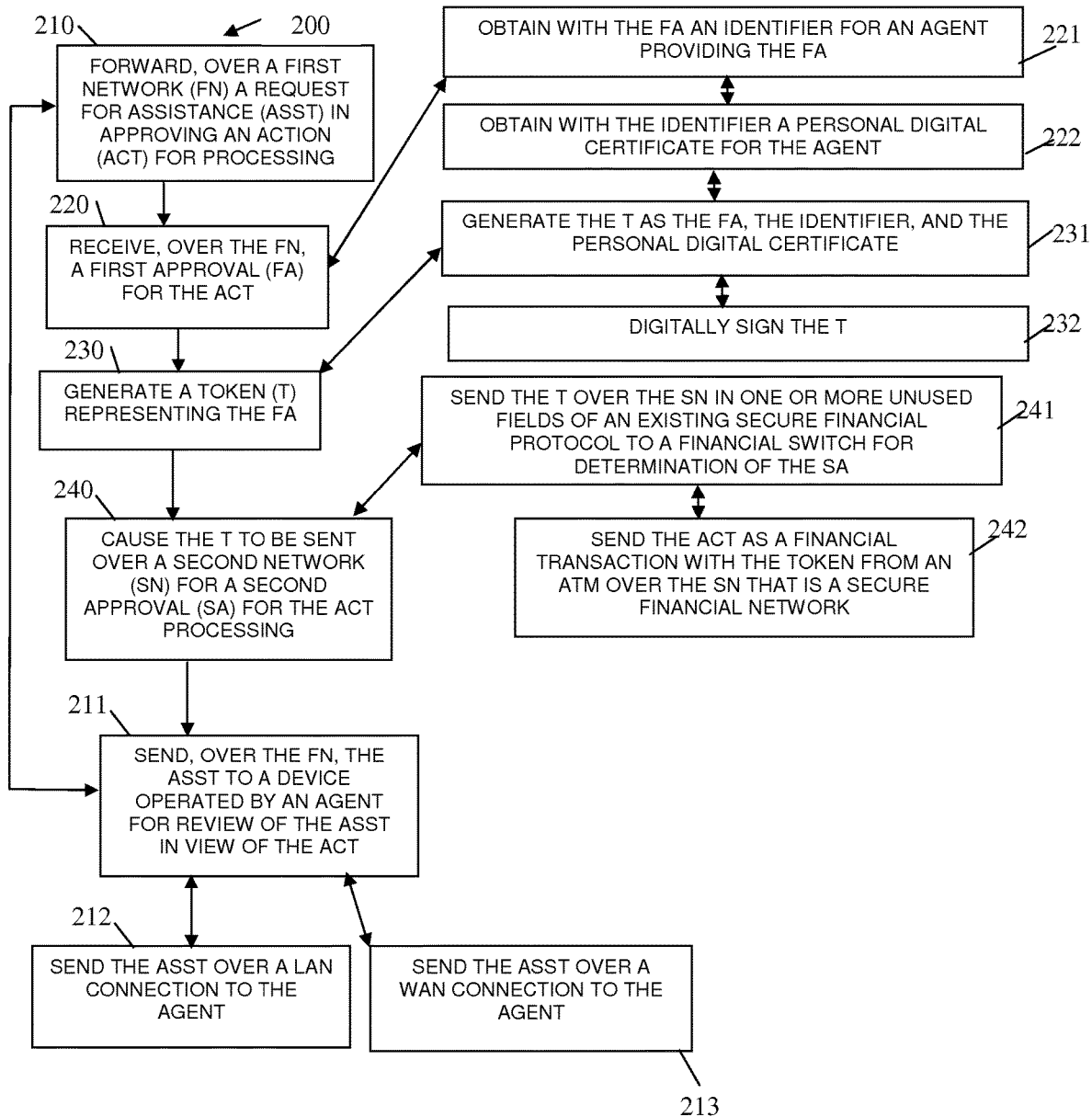
FIG. 2 is a diagram of a method for cross-network action approval, according to an example embodiment.

FIG. 2 is a diagram of a method 200 for cross-network action approval, according to an example embodiment. The software module(s) that implements the method 200 is referred to as a "cross-network manager." The cross-network manager is implemented as executable instructions programmed and residing within memory and/or a non-transitory computer-readable (processor-readable) storage medium and executed by one or more processors of a device. The processors of the device that executes the cross-network manager are specifically configured and programmed to process the cross-network manager. The cross-network manager has access to one or more networks during its processing. The networks can be wired, wireless, or a combination of wired and wireless.

In an embodiment, the device that processes the cross-network manager is the IS server of the FIG. 1.

In an embodiment, the device that processes the cross-network manager is the ATM of the FIG. 1.

In an embodiment, different portions of the cross-network manager are distributed and processed simultaneously on both the IS server and the ATM of the FIG. 1.

In an embodiment, the cross-network manager processes on a Self-Service Terminal (SST). In an embodiment, the SST is a kiosk. In an embodiment, the SST is a self-service checkout station.

In an embodiment, the cross-network manager processes on a SST LAN that connects a plurality of SSTs.

As used herein a "cross-network" refers to two different networks each using different network protocols and communications from the other network.

At 210, the cross-network manager forwards, over a first network, a request for automated assistance in approving an action that is to be processed on a SST (which may or may not be the device that is executing the cross-network manager).

According to an embodiment, at 211, the cross-network manager sends, over the first network, the request for automated assistance to a device operated by an agent for review of the request for automated assistance in view of the action and action details.

In an embodiment of 211 and at 212, the cross-network manager sends the request for automated assistance over a LAN connection to the device (agent operating the device). That is, the device is within the first network based on a LAN connection.

In an embodiment of 213, the cross-network manager sends the request for automated assistance over a WAN connection to the device (agent operating the device). That is, the device is external to a LAN connection for the first network and is accessed over the WAN connection from the first network to deliver the request for automated assistance to the agent.

At 220, the cross-network manager receives, over the first network, a first approval for the action to be processed on the SST.

As an example situation for the processing of 210 and 220, consider a customer operating the SST where the action is a transaction. An interface application on the SST alerts the cross-network manager that there is a request for automated assistance with respect to the transaction. This can be based on the request being initiated by the customer or can be based on automated event detection from the SST (such as an initial denial of the transaction, perhaps, after the transaction was attempted over a second (different network) from the SST with an approving entity (such as a bank)). The cross-network manager forwards the request for automated assistance for the transaction, at 210, to an entity capable of reviewing or evaluating the transaction (perhaps in view of details associated with the customer as well) and the cross-network manager receives the first approval, at 220, as a transaction override that authorizes the SST to process the transaction.

According to an embodiment, at 221, the cross-network manager obtains with the first approval an identifier for an agent that provides the first approval. This agent can be a local agent (with respect to the physical location of SST and accessible within a physical facility associated with the SST) or a remote agent (physically located external to the facility associated with the SST). In an embodiment, the agent is an employee of an enterprise with authority to review the action and provide the first approval. In an embodiment, the agent is an automated application that evaluates the action in view of rules to provide the first approval.

In an embodiment, at 222, the cross-network manager obtains with the identifier a personal digital certificate for the agent. This provides added security that that agent was the entity that determined that the first approval was appropriate for the action.

At 230, the cross-network manager generates a token that represents the first approval. The token provides a secure mechanism for a second approving entity, over a second network (different and cross network from the first network), to validate the first approval. This provides security assurances and auditing capabilities to the second approving entity.

In an embodiment of 222 and 230, at 231, the cross-network manager generates the token as: the first approval, the identifier for the agent providing the first approval, and the personal digital certificate of the agent.

In an embodiment of 231 and at 232, the cross-network manager digitally signs the token.

In an embodiment, the cross-network manager was initially configured at initiation to hold a trust relationship with entities that provide information relevant to generating the token and to entities that subsequently validate the token. This can be achieved via the exchange at startup of certificates and public keys as was discussed above with reference to the FIG. 1.

At 240, the cross-network manager causes the token to be sent over a second network for a second approval for the action processing.

In an embodiment, at 241, the cross-network manager sends the token over the second network in one or more unused fields of an existing secure financial protocol to a financial switch for determination of the second approval. It is to be noted that, in an embodiment, the existing secure protocol is unmodified; rather, one or more unused fields associated with the existing secure protocol are used to include the token.

In an embodiment of 241 and at 242, the cross-network manager sends the action as a financial transaction with the token from an ATM over the secure network, which is a secure financial network (such as the secure financial network discussed above with the FIG. 1). Here, the device that processes the cross-network manager is the ATM.

It is noted that the first and second network are cross networks. That is, they use different protocols for communication and are accessible over different network ports. In an embodiment, the first network is the self-service network and the second network is the secure financial network discussed above with reference to the FIG. 1.

Figure 3:
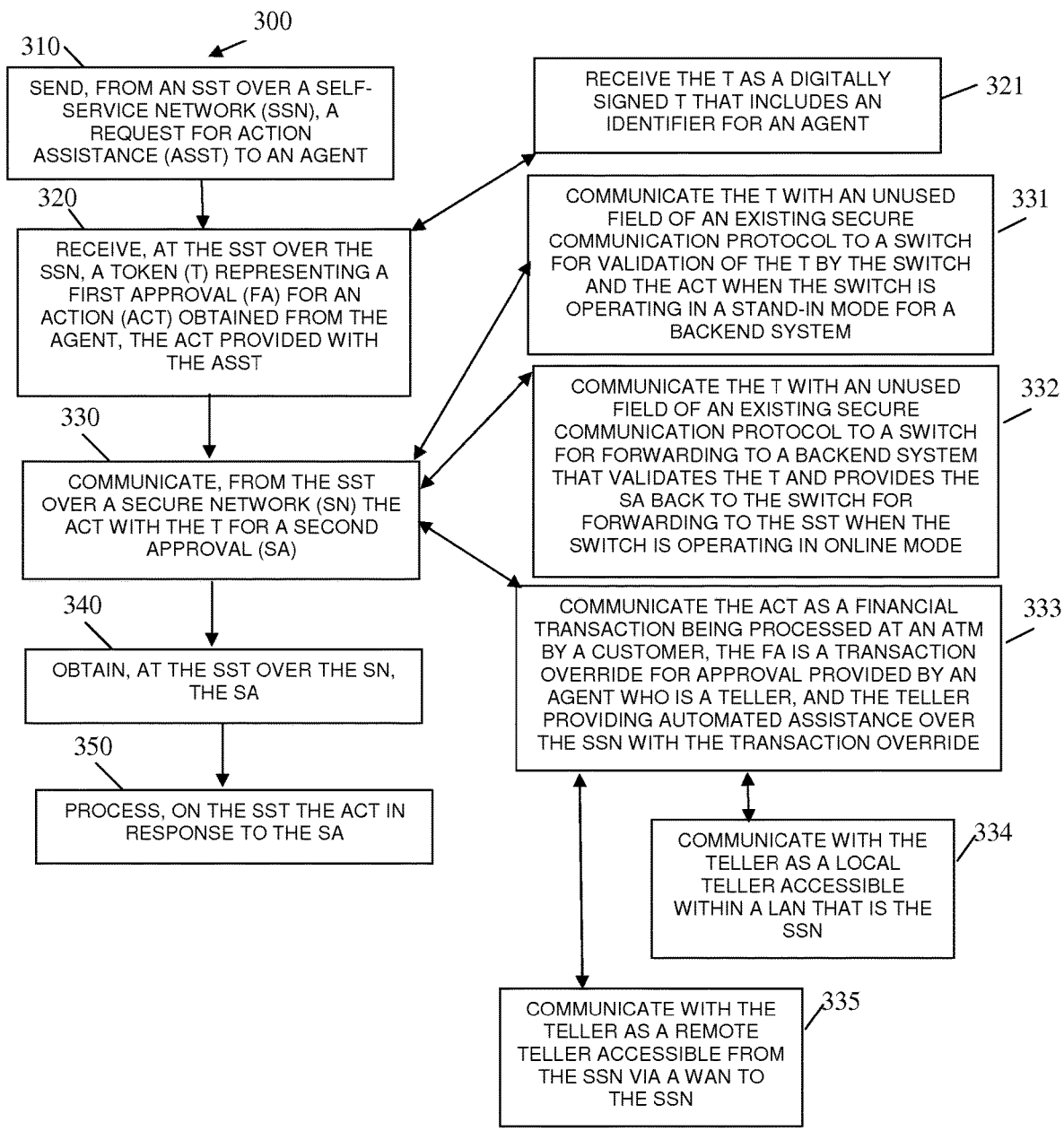
FIG. 3 is a diagram of another method for cross-network action approval, according to an example embodiment.

FIG. 3 is a diagram of another method 300 for cross-network action approval, according to an example embodiment. The software module(s) that implement the method 300 is referred to herein as a Self-Service Terminal (SST) cross-network assistance manager. The SST cross-network assistance manager is implemented as executable instructions and programmed within memory and/or a non-transitory computer-readable (processor-readable) storage medium that executes on one or more processors of a SST; the processors of the SST are specifically configured to execute the SST cross-network assistance manager. The SST cross-network assistance manager can access two or more networks; the networks can be wired, wireless, or a combination of wired and wireless.

In an embodiment, the SST cross-network assistance manager the method 200 of the FIG. 1.

In an embodiment, the SST is the ATM of the FIG. 1.

In an embodiment, the SST is a kiosk.

In an embodiment, the SST is a self-service checkout station.

In an embodiment, the SST cross-network assistance manager is implemented as an enhancement to an existing SST transaction manager.

In an embodiment, the SST cross-network assistance manager is implemented as an enhancement to an existing ATM application of an ATM.

At 310, the SST cross-network assistance manager sends, from a SST, a request for action assistance to an agent. The request includes information relevant to an action that is attempting to be processed by a customer on the SST.

At 320, the cross-network assistance manager receives, at the SST and over a self-service network, a token representing a first approval obtained from an agent (automated application or semi-automated through network communications with a device operated by the agent). The action provided to the agent with the request for action assistance.

In an embodiment, at 321, the cross-network assistance manager receives the token as a digitally signed token that includes an identifier for the agent (entity (automated or semi-automated) providing the first approval).

At 330, the cross-network assistance manager communicates, from the SST and over a secure network, the action (and action details) with the token for a second approval to process the action on the SST.

According to an embodiment, at 331, the cross-network assistance manager communicates the token with an unused field of an existing secure communication protocol to a switch (such as the ATM switch discussed above with the discussion of the FIG. 1) for validation of the token and the action by the switch when the switch is operating in a stand-in mode of operation for a backend system (such as the bank host discussed above with reference to the FIG. 1).

In an embodiment, at 332, the cross-network assistance manager communicates the token with an unused field of an existing secure communication protocol to a switch for forwarding to a backend system that validates the token and the action and further provides back the second approval to the switch for forwarding to the SST when the switch is operating in an online mode of operation.

In an embodiment, at 333, the cross-network assistance manager communicates the action as a financial transaction being processed at an ATM by a customer. The first approval is a transaction override for approval provided by the agent who is a teller. The teller providing automated assistance over the self-service network with the transaction override. It is noted that the automated assistance provided by the teller may be in response to an initial transaction denial by a bank host received at the ATM over the secure network for the transaction (in which case the automated assistance can occur without customer interaction) or the automated assistance provided by the teller may be in response to a customer-initiated request (semi-automated) through an interface of the ATM.

In an embodiment of 333 and at 334, the cross-network assistance manager communicates with the teller as a local teller accessible within a LAN through a locally-teller operated device (terminal, tablet, phone, wearable processing device, etc.). The LAN is the self-service network.

In another embodiment of 333 and at 335, the cross-network assistance manager communicates with the teller as a remote teller accessible from the self-service network via a WAN to the self-service network.

Again, it is to be noted that the self-service network and the secure network are cross networks. Moreover, the secure network uses a secure communication protocol.

Figure 4:
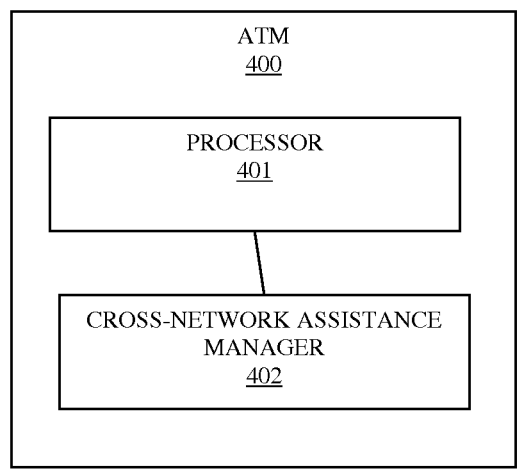
FIG. 4 is a diagram of an Automated Teller Machine (ATM), according to an example embodiment.

FIG. 4 is a diagram of an ATM 400, according to an example embodiment. Various components of the ATM 400 are programmed and reside within memory and/or a non-transitory computer-readable medium and execute on one or more processors of one or more devices. The ATM 400 has access and can communicate over two or networks; and the networks can be wired, wireless, or a combination of wired and wireless.

In an embodiment, the ATM 400 is the ATM of the FIG. 1.

The ATM 400 includes a processor 401 and a cross-network assistance manager 402.

The cross-network assistance manager 402 is configured and adapted to: execute on the processor 401, request approval of an agent for an action to be processed on the ATM 400 over a local ATM network, receive a first approval for the action from the agent as a token over the local ATM network, send the action and the token to an ATM switch over a secure financial network for a second approval, and process the action on the ATM 400 in response to an indication received from the ATM switch, wherein the indication represents the second approval.

In an embodiment, the second approval is one of: 1) provided by the ATM switch in stand-in mode and 2) provided by a financial institution associated with the action through the ATM switch when the ATM switch is in online mode.

It should be appreciated that where software is described in a particular form (such as a component or module) this is merely to aid understanding and is not intended to limit how software that implements those functions may be architected or structured. For example, some modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method of a Self-Service Terminal (SST), the method comprising:
  forwarding, by the SST and over a first network, a request for assistance in approving an action for processing at the SST during a transaction at the SST, wherein forwarding further includes providing with the action transaction details for the transaction, a customer identity associated with a customer performing the transaction at the SST, a transaction type for the transaction, a transaction amount for the transaction, and a SST identifier for the SST, wherein forwarding further includes determining whether to forward request over a Local Area Network (LAN) or a Wide Area Network (WAN) based on the transaction type;
  receiving, by the SST and over the first network, a first approval for the action based on the forwarding, wherein receiving further includes receiving with the first approval a reviewer identifier associated with a reviewer that provided the first approval;

obtaining, by the SST, a digital certificate associated with the reviewer;

generating and digitally signing, by the SST, a token representing the first approval, wherein generating and digitally signing further includes providing within the token: details that identify the reviewer of the request that provided the first approval and the personal certificate that is unique to reviewer;

inserting, by the SST, the token into an unused and an extended field of an existing network protocol associated with existing secure financial network protocol communications with a server;

inserting, by the SST, the action into a known and used field of the existing network protocol;

sending, by the SST, the action and the token to the server over a second network by processing the existing secure financial network protocol communications using the existing network protocol for a second approval of the action during processing of the transaction at the SST; and processing, by the SST, the action on the SST to complete processing of the transaction on the SST in response to receiving the second approval over the second network from the server using the existing secure financial network protocol communications.

2. The method of claim 1, wherein forwarding further includes sending, over the first network, the request for assistance to a device operated by an agent for review of the request for assistance in view of the action, wherein the reviewer is the agent.

3. The method of claim 1, wherein sending further includes sending the token over the second network in the one or more of the unused and extended fields of an existing secure financial protocol to a financial switch for determination of the second approval, wherein the secure financial protocol is the network protocol.

4. The method of claim 3, wherein sending the token further includes sending the action as a financial transaction with the token from an Automated Teller Machine (ATM) over the second network that is a secure financial network, wherein the ATM is the SST and the financial transaction is the transaction.

5. A method, comprising:

sending, from a Self-Service Terminal (SST) over a self-service network, a request for action assistance to an agent during a transaction at the SST, wherein sending further includes providing with the request transaction details for the transaction, a customer identity associated with a customer performing the transaction at the SST, a transaction type for the transaction, a transaction amount for the transaction, and a SST identifier for the SST;

receiving, at the SST over the self-service network, a token representing a first approval for an action obtained from the agent, wherein the action is provided with the request for the action assistance, and wherein receiving further includes identifying from the token a review performed with the first approval by the agent and a personal certificate unique to the agent, and wherein receiving further includes receiving the token as a digitally signed token that is signed within an identifier associated with the agent;

inserting the token into an unused and an extended field of an existing network protocol associated with existing secure financial network protocol communications with a server;

inserting the action into a known and used field of the existing network protocol;

communicating, from the SST over a secure network by processing the existing secure financial network protocol communications using the existing network protocol, with the server, the action with the token to the server for obtaining a second approval;

obtaining, at the SST over the secure network, the second approval from the server; and processing, on the SST, the action to complete processing of the transaction on the SST in response to the second approval.

6. The method of claim 5, wherein communicating further includes communicating the token within one or more of the unused and extended fields of an existing secure communication protocol to a switch for validation of the token by the switch and the action when the switch is operating in a stand-in mode for a backend system.

7. The method of claim 5, wherein communicating further includes communicating the token within one or more of the unused and extended fields of an existing secure communication protocol to a switch for forwarding to a backend system that validates the token and provides the second approval back to the switch for forwarding to the SST when the switch is operating in an online mode.

8. The method of claim 5, wherein communicating further includes communicating the action as a financial transaction being processed at an Automated Teller Machine (ATM) by the customer, wherein the first approval is a transaction override for approval provided by the agent who is a teller, and the teller providing automated assistance over the self-service network with the transaction override, wherein the ATM is the SST and the financial transaction is the transaction.

9. The method of claim 8, wherein communicating further includes communicating with the teller as a local teller accessible within a Local Area Network that is the self-service network.

10. The method of claim 8, wherein communicating further includes communicating with the teller as a remote teller accessible from the self-service network via a Wide Area Network to the self-service network.

11. An Automated Teller Machine (ATM), comprising:

a processor;

non-transitory computer-readable storage medium including executable instructions representing a cross-network assistance manager; and the cross-network assistance manager when executed by the processor from the non-transitory computer-readable storage medium is configured to cause the processor to:

request an approval of an agent for an action to be processed on the ATM over a local ATM network during a transaction at the ATM, wherein the request include the action transaction details for the transaction, a customer identity associated with a customer performing the transaction at the ATM, a transaction type for the transaction, a transaction amount for the transaction, and an ATM identifier for the ATM;

receive a first approval for the action from the agent as a token over the local ATM network, where the approval includes a review performed by the agent and a personal certificate of the agent, wherein the token is digitally signed by an identifier associated with the agent;

insert the token into an unused and an extended field of an existing network protocol associated with existing secure financial network protocol communications with a server;

insert the action into a known and used field of the existing network protocol send the action and the token to an ATM switch associated with the server over a secure financial network by processing the existing secure financial network protocol communications using the existing network protocol for obtaining a second approval; and process the action on the ATM to complete processing of the transaction on the ATM in response to an indication received from the ATM switch provided by the server using the existing secure financial network protocol communications, wherein the indication represents the second approval received from the server.

12. The ATM of claim 11, wherein the second approval is one of:

provided by the ATM switch in stand-in mode and provided by a financial institution associated with the action through the ATM switch when the ATM switch is in online mode.

\* \* \* \* \*